CIRCUIT ARRANGEMENT FOR SELECTIVE AND DURABLE SIGNAL COUPLING

Filed Oct. 4, 1966

Teruo Hiyoshi
INVENTOR.

BY George B. Oujevolk
Attorney

United States Patent Office 3,488,515

Patented Jan. 6, 1970

3,488,515

CIRCUIT ARRANGEMENT FOR SELECTIVE AND DURABLE SIGNAL COUPLING

Teruo Hiyoshi, Hamamatsu-shi, Japan, assignor to Nippon Gakki Seizo Kabushiki Kaisha, Hamamatsu-shi, Shizuoka-ken, Japan, a corporation of Japan Filed Oct. 4, 1966, Ser. No. 584,137

Claims priority, application Japan, Oct. 8, 1965, 40/61,770

Int. Cl. H03k *17/62*

U.S. Cl. 307—241 12 Claims

ABSTRACT OF THE DISCLOSURE

A circuit arrangement comprising transistor flip-flops each including a first and a second transistor wherein emitters of the first transistors are grounded and bases thereof are respectively grounded via a normally open switch, and emitters of the second transistors are connected together and grounded via an impedance element and bases thereof are respectively grounded via resistors, which renders one of the first transistors cut-off and the rests conducting at a time. Input signal respectively lead to collectors of the first transistors and in turn to an output wherein a cut-off first transistor permits an input signal to come out to the output and conducting first transistor shunts inputs signals preventing their coming out to the output.

This invention relates to a circuit arrangement for use in connection with a selective and durable signal coupling, and more particularly to a circuit arrangement comprising a plurality of transistorized flip-flop circuits and adapted to select an optional signal among a plurality of input signals and to temporarily or semi-permanently keep the resultant state of coupling.

Heretofore, lock-and-release type pushbutton switching systems of mechanical construction are well-known in the art of switching operation where an arbitrary switch from a group of switches is selectively closed, while at the same time opening another switch which has been previously closed and maintained in the closed state.

These switching systems of mechanical construction, however, posses various problems to be solved in conjunction with reliability, maintenance, response time, manufacture and so forth.

The primary object of this invention is to solve the above problems by providing an electric circuit arrangement for selective and durable coupling, where an optional input signal may be selected from a plurality of input signal sources to be available as the output signal at output terminals and the resultant state of coupling is maintained until another coupling is made, and where only one coupling is possible at one time, by resorting to an electronic structure instead of a mechanical one such as pushbutton switch mechanism.

Another object of this invention is to provide an electric circuit arrangement for selective and durable signal coupling, which is subject to scarce troubles, simple in construction and very quick in response.

It is a further object of this invention to provide a circuit arrangement for selective and durable signal coupling which finds advantageous applications in the pedal switch in the performance of electronic organs to selectively couple a plurality of input sources to the output terminals.

The circuit arrangement for selective and durable signal coupling in accordance with this invention is obtained by making use of a plurality of flip-flop circuits each including first and second transistors, with the emitter terminal of the first transistor directly gorunded while the emitter terminal of the second transistor connected to a grounded impedance element common to all emitters of the second transistors and the base terminal of each of the first transistors connected to a grounded switch while the base terminal of each of the second transistors connected to a grounded resistor, so that at most, only one flip-flop circuit has a cut-off first transistor and all the rests have conducting first transistors at any one time, and including a signal take-in resistor connected between an input terminal and a collector of the first transistor and a signal take-out resistor connected between an output terminal and said collector, wherein an input signal whose associated first transistor is in a cut-off state is led to the output terminal and other input signals whose associated first transistors are in conducting states are shunted to the ground and not let to the output.

The invention is now described in detail, reference being had to the accompanying drawing, in which.

Figure 1:
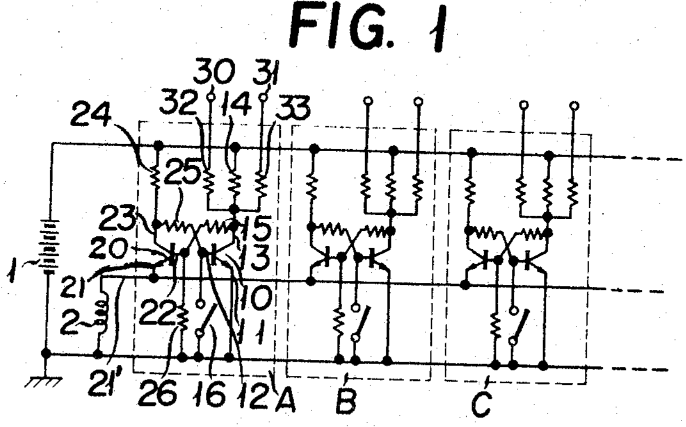
FIG. 1 is a circuit diagram illustrating a fundamental embodiment of the circuit arrangement for selective and durable signal coupling according to the invention.

The circuit arrangement shown in FIG. 1 represents a fundamental embodiment according to the invention. For the sake of simplification there are shown only three of a larger number of the flip-flop circuits indicated at A, B and C. The flip-flop circuits are the basic components of the arrangement respectively comprising n-p-n transistors 10 and 20, load resistors 14 and 24, and coupling resistors 15 and 25. The load resistors 14 and 24 are connected to the positive side of a DC source 1 which is grounded at its negative side, and the emitters 11 of the transistors 10 are also grounded. When the DC source 1 is grounded at its positive side, the above-mentioned description would read as the emitter 11 of the transistors 10 are connected to the negative side of the DC source 1. The emitters 21 of the transistors 20 are all connected to an emitter common lead 21' which is in turn grounded through a serially inserted inductor 2. The bases 22 of the transistors 20 are connected to respectively grounded resistors 26, while the bases 12 of the transistors 10 are connected to respectively grounded switches 16.

Assuming that all of the switches 16 are open, when the source 1 is connected to the arrangement the transistors 10 of the respective flip-flop circuits all start conducting, while the transistors 20 remain cut off. This behavior of the arrangement will be understood from the fact that the potentials of the collectors 13 and 23 of the transistors 10 and 20 respectively initially tend to build up equally by virtue of load resistors 14 and 24 when the source 1 is applied, whereas the base potentials of the transistors 20 develop to lower potentials because of the resistors 26 than do the base potentials of the transistors 10.

Under this condition where all of the switches 16 are open with all the transistors 10 conducting and all the transistors 20 cut off, for instance if switch 16 of flip-flop circuit A is closed the base potential of the transistor 10 of this circuit suddenly goes to the emitter potential, thereby causing a transistive action of the circuit to the opposite state where transistor 10 is cut off and transistor 20 carries current. This opposite state with transistor 10 cut off and transistor 20 conducting never undergoes another shift when the switch 16 of the same flip-flop circuit A is re-opened.

If now another switch, for instance, switch 16 of flip-flop circuit B is closed this circuit flips to the opposite state in the same manner as described above with transistor 10 becoming cut off while transistor 20 starting conduction. At the instant the transistor 20 starts conducting the current through inductor 2 momentarily increases just by an amount carried by the transistor 20, thus causing the inductance of inductor 2 to oppose this abrupt change in current to increase voltage on the emitter common lead 21' suddenly. As the result the transistor 20 which has been carrying current now becomes cut off. After the transient state is over the current through inductor 2 diminishes to a normal slight value, so that the voltage at emitter common lead 21' is decreased to a value determined by an inherent resistance of the inductor 2; that is, it almost equals ground potential. In this manner any flip-flop circuit corresponding to a selectively operated switch is triggered to the opposite condition which is maintained until another switch is selectively operated, while at the same time automatically restoring the initial condition of a precedingly triggered flip-flop circuit.

The above-mentioned flip-flop action of the arrangement is now briefly explained with the transistors 10 representing the operation states of all the flip-flop circuits, the flip-flop circuit with a conducting transistor 10 being regarded as in the "on" state. When the source 1 is applied, all the flip-flop circuits may be regarded to be turned on, and thereafter every time an optional switch is closed only the corresponding flip-flop circuit is turned off. When afterwards the switch is re-opened the circuit will retain its "off" condition. Of course, the condition does not change if the same switch is closed again.

Further, when two or more switches are closed at the same time there is inevitably only one flip-flop circuit that will flip, i.e., the one whose switch has been closed earliest.

Furthermore, when the switch of that flip-flop circuit which has flipped is subsequently re-opened, one of the remaining flip-flop circuits whose switches are left closed will this time flip, while the previously flipped circuit will return to its initial condition.

Figure 2:
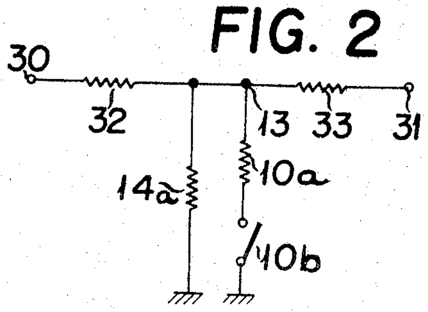
FIG. 2 shows an equivalent circuit of one of the flip-flop circuits to illustrate functional principles of the arrangement shown in FIG. 1.

In the circuit arrangement shown in FIG. 1 where input terminals 30 and output terminals 31 are connected to the collectors 13 of the transistors 10 through signal take-in resistors 32 and signal take-out resistors 33 respectively, the external behavior of any flip-flop circuit may be approximated by an equivalent circuit shown in FIG. 2 as a shunt type gating circuit. In this figure the reference numeral **14*a* designates a lumped equivalent resistor constituted by resistors 14, 15 and 26, 10*a* denotes an internal resistance of the transistor 10 at its conducting state, and 10*b* designates an imaginary switch attributed to the switching action of the transistor 10. It will thus be apparent from this equivalent circuit that when the resistance $R_{14a}$ of the equivalent resistor 14*a* is very high with respect to the value $R_{10a}$ of the internal resistance 10*a* ($R_{14a} \gg R_{10a}$), then the switching ratio or the ratio of a signal output at an available state versus the same at a shunted state will approximately be the ratio of $R_{14a}$ to $R_{10a}$. By way of example, when the resistance of both resistors 32 and 33** is set at 100 kilo-ohms, $R_{14a}$ at 10 kilo-ohms and $R_{10a}$ at 30 ohms, 50 decibels of switching ratio may be obtained.

In FIG. 1, when the output signal is led to one predetermined following circuit, one output terminal is, of course, sufficient, therefore the terminals 31 are connected in common to be one output terminal, the resistors 33 acting as mixing resistors.

Figure 3:
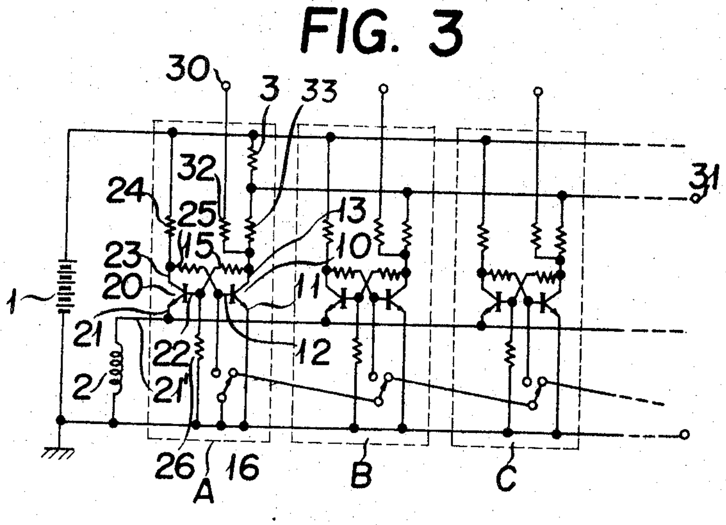
FIG. 3 is a circuit diagram illustrating another embodiment of the circuit arrangement for selective and durable signal coupling according to the invention.

The arrangement shown in FIG. 3 is designed to obtain selective coupling between a plurality of input sources on the one hand and a single output terminal on the other hand and in a different DC power feeding manner other than FIG. 1. In actual practice the arrangement of FIG. 3 is often used for electronic musical instruments as will be described hereinafter in detail.

The arrangement shown in FIG. 3 differs from that shown in FIG. 1 in that it is adapted to achieve what might be called a preference coupling among a plurality of input sources by means of a corresponding number of change-over switches which are serially connected one after another in the whole-switch open condition, and that the signal taking-out resistors here serve also for the load resistors, thus decreasing resistors in number. The same parts here as those in FIG. 1 are labelled by the same reference numerals. In this arrangement the ends of the signal take-out resistors 33 opposite to the ends connected to the collectors 13 of the transistors 10 are all connected both to a common output terminal 31 and to a common resistor 3 which is in turn connected to the positive side of the DC source 1. The resistor 3 serves to derive output signals and to supply current to all of the load resistors 14. The latter function requires the resistance of the resistor 3 to be small enough as compared with the resistors 33, so that there should be negligibly a small voltage drop of DC power supplied across the resistor 3. As is viewed from FIG. 3 the switches 16 are connected one after another in a positional preference fashion so that a simultaneous closure of two or more switches 16 will not result in confusion but will effectively result in one switch closure. Since the load resistors are acted by the signal take-out resistors in this arrangement, economy in component parts is attained to the advantage.

As had been previously mentioned this arrangement may be advantageously employed, for example, in the pedal switch device for an electronic organ, which is usually equipped with 13 pedal keys. During performance of such an organ, however, there is no opportunity of pedalling more than one pedal key at a time, but always only one pedal key is pedalled at one time. When there are 13 pedal keys involved, also there are provided 13 corresponding sound source circuits. To selectively take out signals from these sound source circuits, the circuit arrangement described hereinbefore may be inserted between an array of sound source circuits and the following circuits, for example, a circuitry which may in this case comprise a frequency divider and a percussion keyer. In the absence of the circuit arrangement according to the invention, said following circuits must contain a number of frequency dividers and of percussion keyers corresponding to the number of the frequency dividers, 13 for a usual electronic organ, so that it will be apparent that the arrangement according to the invention can simplify the construction of the electronic organ and contribute to the economy.

The circuit element constants of the embodiment shown in FIG. 3 were selected to be 12 volts for DC source 1, one henry for inductor 2 (100 ohms in its inherent resistance), 250 ohms for resistor 3, 10 kilo-ohms for resistors 33, 24 and 25, 20 kilo-ohms for resistors 15 and 26, and 100 kilo-ohms for resistors 32, and n-p-n type silicon transistors were used for transistors 10 and 20. The selective signal coupling among thirteen input signals to one output terminal by using the above specified arrangement proved to be very excellent. To trigger any flip-flop circuit of the arrangement according to the invention, it is theoretically sufficient for the voltage at the emitter common lead 21' to momentarily increase by about 1 volt. Actually, a sudden increase of about 2 volts of the potential at the emitter common lead 21' was observed whenever an optional switch is closed, thereby causing smooth triggering of the corresponding flip-flop circuit. Also varying the inductance of the inductor 2 in a range between 50 milli-henrys and 10 henrys had substantially no effect upon formal functioning of the arrangement.

When silicon transistors are used as in the preceding embodiments the effects of the inherent resistance of inductor 2 do not give rise to much trouble, since the dynamic characteristics of the silicon transistor has an emitter-base cut-off range (a range of emitter-to-base forward bias voltage at which the transistor does not carry current) of the order of about 0.5 volt. In case of germanium transistors, however, their emitter-base cut-off range is extremely small, so the inherent resistance of the inductive element here must be set to a comparatively small value. Also in this case instead of using inductor 2 having a reduced inherent resistance, its grounded side may be biassed further negatively to such an extent that the bias voltage makes up for the voltage drop due to the inherent resistance (when the transistors are of p-n-p type the grounded side should accordingly be biassed further positively), or alternatively the bases 12 of the transistors 10 may respectively be grounded via further resistors (not shown), whereby better functioning of the arrangement may be obtained.

In the preceding arrangements an inductance is used as the impedance for inducing an impulse voltage thereacross at the time an optional switch is closed. It is possible to use a resistance instead, but an inductance is apparently most preferable.

As has been described in the foregoing this invention thus provides an arrangement adapted to select an optional input signal among a plurality of signal sources and to temporarily or semi-permamently preserve the coupled state, which is of electric, instead of mechanical construction, so that it has various advantages such as high reliability, substantial freedom from trouble, quick response, capability of using switches of simple construction and so forth. Further by using an inductor as the emitter feedback inductance element for restoring the initial condition of the precedingly triggered flip-flop circuit by the flip-flop action of the newly triggered flip-flop circuit, fine adjustments of the values of the other passive component elements becomes unnecessary, and also separate reverse bias voltage sources which may otherwie be used for the restoration of the previously triggered flip-flop circuit are not required to the manufactural advantage.

What is claimed is:

1. A circuit arrangement for selective and durable signal coupling comprising: a plurality of flip-flop circuits, each of said flip-flop circuits including a first transistor whose emitter terminal is grounded and which is normally conducting and is cut off when a grounded switch connected to its base terminal is closed, a second transistor whose emitter is connected to a grounded impedance element common to all the emitter terminals of the second transistors of said flip-flop circuits, whose base terminal is connected to a grounded resistor and which is normally cut off and starts conducting when said switch is closed, a signal take-in resistor connected between an input terminal and the collector of said first transistor, and a signal take-out resistor connected between an output terminal and said collector.

2. A circuit arrangement for selective and durable signal coupling as defined in claim 1 wherein said impedance element is an inductor.

3. A circuit arrangement for selective and durable signal coupling as defined in claim 1 wherein said impedance is a resistor.

4. A circuit arrangement for selective and durable signal coupling as defined in claim 1 wherein each of said switches comprises a first fixed contact connected to the base of said first transistor, a movable contact and a second fixed contact connected to the movable contact of an abutting switch, said movable contact selected being connected to one end of a power source so as to form a positional preference fashion.

5. A circuit arrangement for selective and durable signal coupling as defined in claim 4 wherein said impedance element is an inductor.

6. A circuit arrangement for selective and durable signal coupling as defined in claim 4 wherein said impedance is a resistor.

7. A circuit arrangement for selective and durable signal coupling as defined in claim 1 wherein the collector of said each first transistor is connected to a common output terminal through each of said signal take-out resistors so that said resistors also serve as load resistors and a DC power is supplied through a further resistor to said output terminal, whereby a plurality of input terminals and only one output terminal may be provided.

8. A circuit arrangement for selective and durable signal coupling as defined in claim 7 wherein said impedance element is an inductor.

9. A circuit arrangement for selective and durable signal coupling as defined in claim 7 wherein said impedance is a resistor.

10. A circuit arrangement for selective and durable signal coupling as defined in claim 7 wherein each of said switches comprises a first fixed contact connected to the base of said first transistor, a movable contact and a second fixed contact connected to the movable contact of an abutting switch, said movable contact selected being connected to one end of a power source so as to form a positional preference fashion.

11. A circuit arrangement for selective and durable signal coupling as defined in claim 10 wherein said impedance element is an inductor.

12. A circuit arrangement for selective and durable signal coupling as defined in claim 10 wherein said impedance is a resistor.

References Cited

FOREIGN PATENTS 1,144,769 3/1963 Germany.

DONALD D. FORRER, Primary Examiner

DAVID CARTER, Assistant Examiner

U.S. Cl. X.R.

84—1.01; 307—247, 254, 291